United States Patent
Hendry et al.

(10) Patent No.: US 8,977,429 B2
(45) Date of Patent: Mar. 10, 2015

(54) SYSTEM AND METHOD FOR SHIFTING THE TRANSFER CASE INTO AND OUT OF THE NEUTRAL POSITION USING AN ELECTRONIC VEHICLE INFORMATION CENTER

(71) Applicants: Jeffrey C Hendry, Waterford, MI (US); Michael Mashkevich, West Bloomfield, MI (US)

(72) Inventors: Jeffrey C Hendry, Waterford, MI (US); Michael Mashkevich, West Bloomfield, MI (US)

(73) Assignee: Chrysler Group LLC, Auburn Hills, MI (US)

(*) Notice: Subject to any disclaimer, the term of this patent is extended or adjusted under 35 U.S.C. 154(b) by 162 days.

(21) Appl. No.: 13/720,173

(22) Filed: Dec. 19, 2012

(65) Prior Publication Data

US 2014/0172249 A1 Jun. 19, 2014

(51) Int. Cl.
*G06F 7/00* (2006.01)
*G06F 17/00* (2006.01)
*B60K 28/10* (2006.01)
*F16H 61/00* (2006.01)

(52) U.S. Cl.
CPC ..................... *F16H 61/00* (2013.01)
USPC ............ 701/36; 701/51; 701/53; 701/69; 340/425.5; 340/462; 180/338

(58) Field of Classification Search
USPC ............. 701/1, 36, 49, 51, 52, 53, 62, 64, 65, 701/69, 82, 89; 340/425.5, 438, 439, 441, 340/453, 456, 459–462; 180/233, 271, 272, 180/337, 338
See application file for complete search history.

(56) References Cited

U.S. PATENT DOCUMENTS 5,522,777 A * 6/1996 Baxter et al. ............... 477/36

* cited by examiner

*Primary Examiner* — Thomas Tarcza
*Assistant Examiner* — Edward Pipala
(74) *Attorney, Agent, or Firm* — Ralph E Smith

(57) ABSTRACT

A system for shifting a vehicle's transfer case into or out of the neutral position, using an electronic vehicle information center. The system comprises a transfer case control module connected to a transfer case and an electronic vehicle information center connected to the transfer case control module. The electronic vehicle information center instructs the transfer case control module to shift the transfer case into or out of the neutral position by detecting an input signal request from a control panel to shift the transfer case into or out of a neutral position, and sending an instruction signal to the transfer case control module to shift the transfer case into or out of the neutral position.

11 Claims, 3 Drawing Sheets

SYSTEM AND METHOD FOR SHIFTING THE TRANSFER CASE INTO AND OUT OF THE NEUTRAL POSITION USING AN ELECTRONIC VEHICLE INFORMATION CENTER

FIELD

The present disclosure relates to a system and method for shifting a transfer case into or out of the neutral position, using an electronic vehicle information center ("EVIC"), on a four-wheel drive or all-wheel drive vehicle.

BACKGROUND

A transfer case is required in vehicles that power all four of the vehicle's wheels (i.e., four-wheel and all-wheel drive vehicles). The transfer case is connected to the transmission and directs power to both the front and rear axles. In particular, the transfer case receives power from the transmission and sends it to the front and rear axles.

On occasion, the transfer case must be put into a neutral position, which is accomplished by decoupling the transfer case from the transmission. For instance, the transfer case must be put into the neutral position before recreationally towing the vehicle or attaching the vehicle to e.g., an RV. This prevents damage to the vehicle's transfer case and transmission.

To put the electronic transfer case into the neutral position, current vehicles require the driver to manually activate an electric switch that decouples the transfer case from the transmission. The electric switch generally consists of a button that the driver pushes with his or her finger or a much smaller plunger-type button that requires a small object such as a pin to press it in. The electric switch, however, is susceptible to sticking, especially if the driver inadvertently spills a beverage/liquid on the switch. For instance, a driver may spill a sticky liquid on the switch that causes the switch to stick the next time the driver presses it. When this occurs, the driver is unable to shift the transfer case out of neutral. Another drawback of the current switch is that it is not multi-functional and only serves one purpose, i.e., decoupling the transfer case from the transmission.

Accordingly, there is a need and desire to provide an improved system and method for shifting the transfer case into and out of the neutral position.

SUMMARY

In one form, the present disclosure provides a system for shifting a vehicle's transfer case into or out of a neutral position. The system comprises a transfer case control module connected to a transfer case and an electronic vehicle information center connected to the transfer case control module. The electronic vehicle information center instructs the transfer case control module to shift the transfer case into or out of the neutral position by detecting an input signal request to shift the transfer case into or out of the neutral position, and sending an instruction signal to the transfer case control module to shift the transfer case into or out of the neutral position based on the detected input signal.

The present disclosure also provides a method for shifting the transfer case into or out of a neutral position using an electronic vehicle information center. The method comprises detecting the vehicle's run position, detecting a transfer case screen on an electronic vehicle information center display, detecting an input signal requesting to shift the transfer case into or out of the neutral position, and determining whether predetermined conditions exist to allow the transfer case to be shifted into or out of the neutral position.

In one embodiment, the electronic vehicle information center comprises an electronic display that provides visual and/or audio instructions for shifting the transfer case into or out of the neutral position. The electronic display may also provide visual and/or audio information about the transfer case. Further, the electronic display may output a visual and/or an audio indication of whether the transfer case has been shifted into or out of the neutral position.

Further areas of applicability of the present disclosure will become apparent from the detailed description provided hereinafter. It should be understood that the detailed description, including disclosed embodiments and drawings, are merely exemplary in nature intended for purposes of illustration only and are not intended to limit the scope of the invention, its applicability or use. Thus, variations that do not depart from the gist of the invention are intended to be within the scope of the invention.

DETAILED DESCRIPTION

Figure 1:
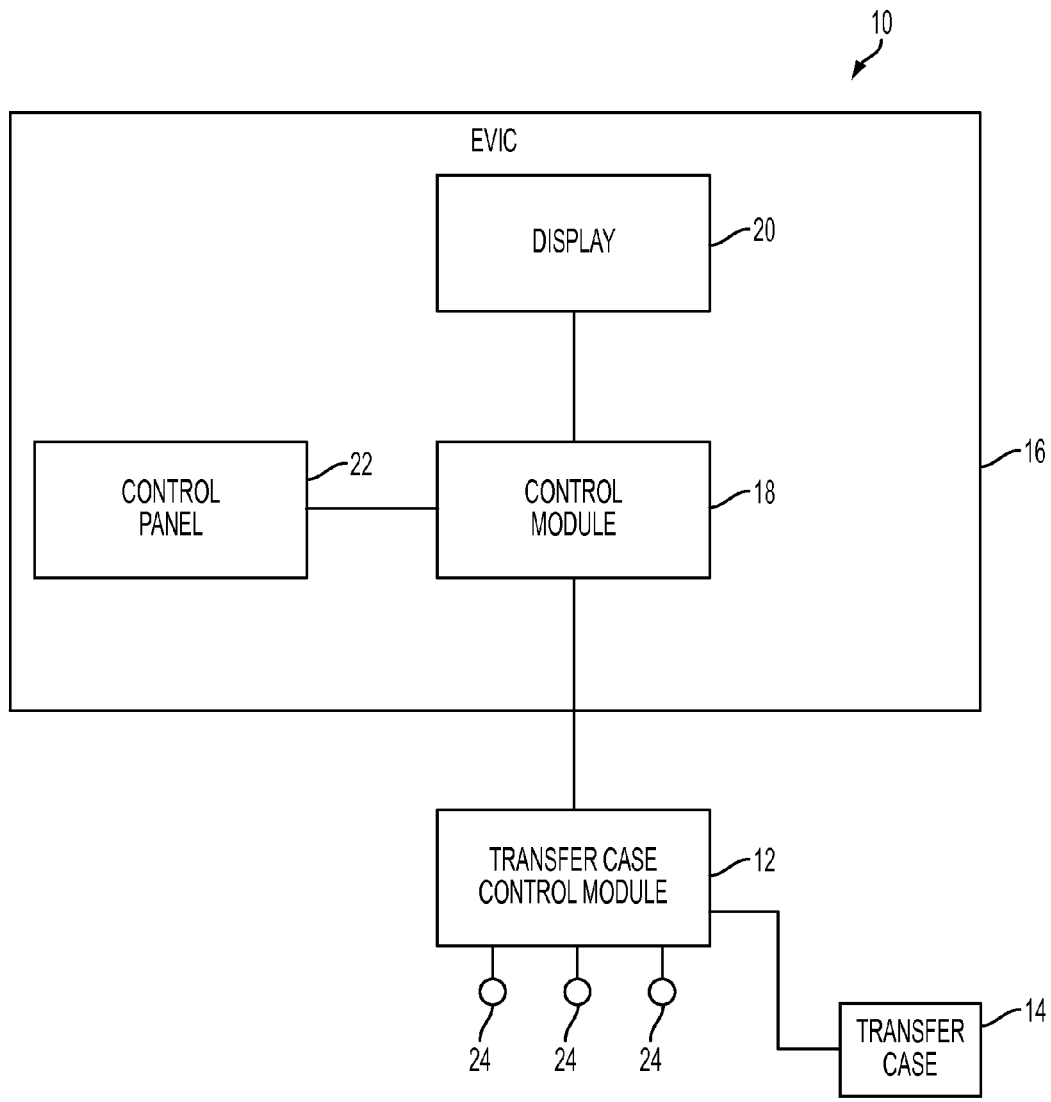
FIG. 1 illustrates an exemplary system for shifting the transfer case into or out of the neutral position, using an electronic vehicle information center, constructed in accordance with an embodiment disclosed herein.

FIG. 1 illustrates an exemplary system 10 for shifting a vehicle's transfer case into or out of the neutral position using an electronic vehicle information center ("EVIC") 16. In a preferred embodiment, the system 10 is used on a four-wheel drive or all-wheel drive vehicle. The system 10 comprises the EVIC 16, which includes a control module 18 connected to an electronic display 20 and a control panel 22. In some embodiments, the EVIC 16 may include multiple electronic displays 20. The display 20 may also have an audio output such as a speaker. The display 20 may also be a touch screen display device.

The EVIC 16 typically allows the driver to control multiple functions of the vehicle such as e.g., horn chirp, accelerator off, cruise control, etc. The EVIC 16, through its display 20, also typically provides the driver with information related to the vehicle and its operation as well as information related to various driving components such as e.g., compass direction, odometer, outside temperature, etc.

The control panel 22 of the EVIC 16 allows the driver to scroll through the items and menus displayed on the display 20 and make selections, allowing the driver to control multiple functions of the vehicle. The control panel 22 may include one control button or multiple control buttons, and/or may be a touch screen. As the driver scrolls though the items/menus on the display 20 and makes selections using the control panel 22, the control panel 22 sends signals corresponding to the driver's input to the control module 18. The control module 18 then sends the signals and/or additional information to the display 20. The EVIC's control module 18 is connected to a transfer case control module 12, which is connected to and controls a transfer case 14. The transfer case control module 12 may be any control module suitable for controlling the transfer case 14. For instance, the transfer case control module 12 may be a vehicle drivetrain control module (DTCM) suitable to control the transfer case 14. It should be appreciated that the novel disclosure provided herein is not limited to the EVIC 16 being connected to a transfer case control module 12. For instance, the EVIC 16 may directly control the transfer case 14 and/or perform the functions of the transfer case control module 12, if desired.

Figure 3:
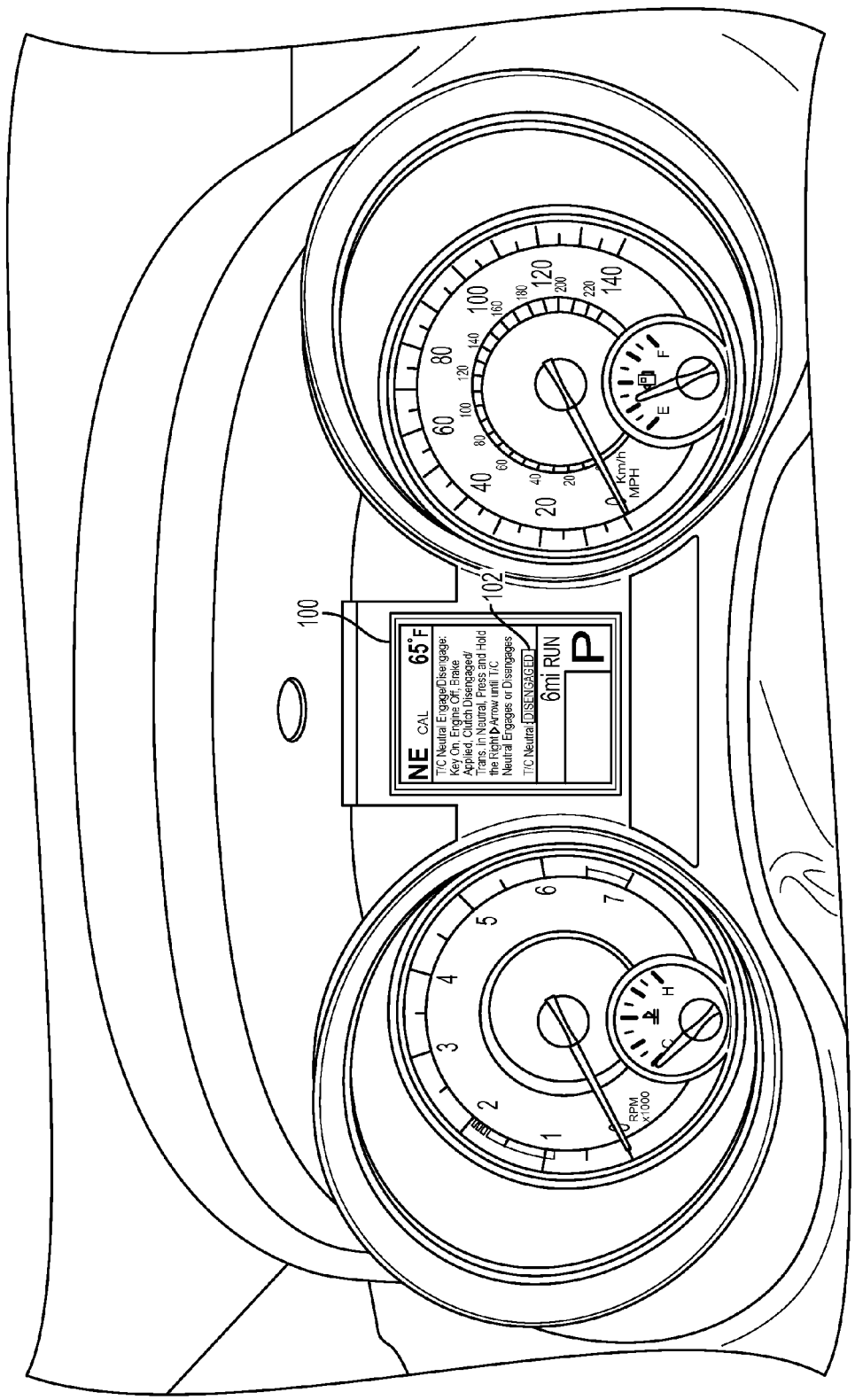
FIG. 3 illustrates an exemplary transfer case screen on an electronic vehicle information center display constructed in accordance with an embodiment disclosed herein.

The display 20 includes a transfer case screen (an example screen 100 is shown in FIG. 3), which allows the driver to shift the transfer case 14 into or out of the neutral position. The transfer case screen 100 includes any display or menu that pertains to the transfer case 14. While the display 20 is displaying the transfer case screen 100, the display 20 may provide visual and/or audio instructions and/or predetermined conditions for shifting the transfer case 14 into or out of the neutral position using the EVIC 16. The display 20 may also provide the driver with information about the transfer case 14 and its current positioning (e.g., see indicator 102 in FIG. 3). For example, the display 20 may indicate whether the transfer case 14 is in the neutral or other position. A plurality of sensors 24 that are attached to the transfer case 14 and connected to the control module 18 (either directly or through the transfer case control module 12) provide this information.

When the driver uses the control panel to make a selection of an item on the EVIC display 20, i.e., to shift the transfer case 14 into or out of the neutral position, the corresponding signal from control panel 22 is sent to the control module 18. The control module 18 then determines if an instruction signal should be sent to the transfer case control module 12. In some embodiments, the driver must press and hold its selection to shift the transfer case 14 into or out of the neutral position for several seconds (i.e., a safety feature to make sure the selection was not done by mistake) before the control module 18 instructs the transfer case control module 12 to shift the transfer case 14 into or out of the neutral position. For instance, the driver may have to press and hold down a certain button on the control panel 22 for at least five seconds before the control module 18 acknowledges the selection and sends an instruction signal to the transfer case control module 12 to shift the transfer case 14 into or out of the neutral position. If the control module 18 determines that an instruction signal should not be sent to the transfer case control module 12 (e.g., the driver failed to hold his or her selection for at least five seconds), the driver must reattempt to make the selection.

In addition, a number of preconditions must exist before the control module 18 will instruct the transfer case control module 12 to shift the transfer case 14 into or out of the neutral position and/or before the transfer case control module 12 shifts the transfer case 14 into or out of the neutral position. Thus, the control module 18 and/or the transfer case control module 12 must determine whether the predetermined conditions exist. If the control module 18 and/or transfer case control module 12 determine that the predetermined conditions do not exist, the driver must reattempt the selection. In one embodiment, the predetermined conditions include, but are not limited to, the vehicle's engine being off, the vehicle's brakes being applied, and the vehicle's transmission being in neutral.

The display 20 may provide an indication of whether the transfer case 14 is shifted into or out of the neutral position by a visual display and/or an audio message or tone. The display 20 may be positioned anywhere in the vehicle. Typically, however, the display 20 is positioned on or near the dashboard so that the driver can view the display 20 while driving the vehicle. Likewise, the control panel 22 may be positioned anywhere in the vehicle. Typically, however, the control panel 22 is positioned on or near the steering wheel of the vehicle so that it is easily accessible to the driver while driving the vehicle.

Figure 2:
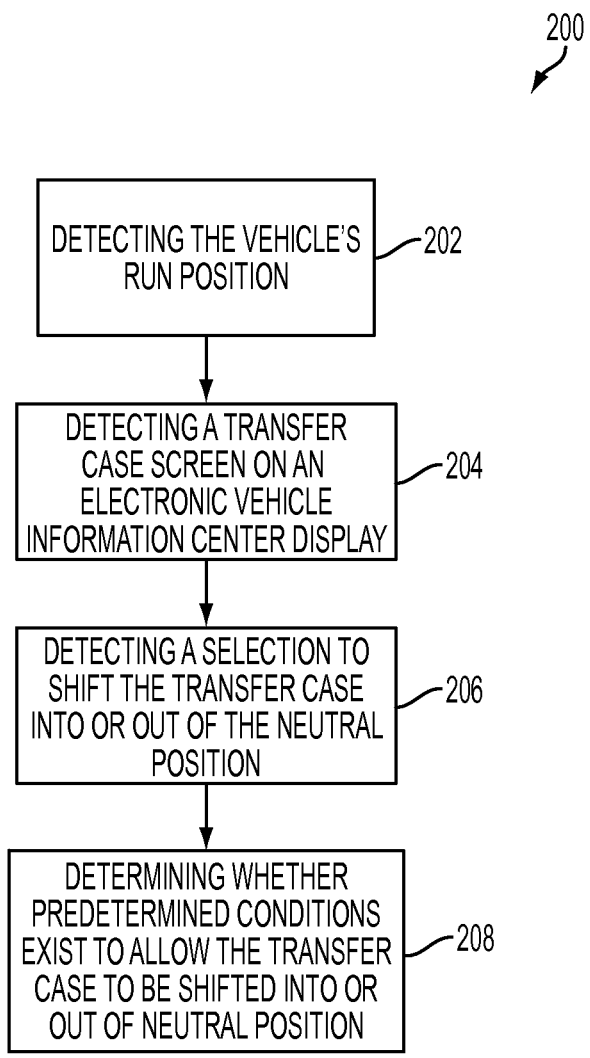
FIG. 2 illustrates an exemplary method for shifting the transfer case into or out of the neutral position, using an electronic vehicle information center, in accordance with an embodiment disclosed herein.

FIG. 2 illustrates an exemplary method 200 for shifting the transfer case 14 into or out of the neutral position, using an electronic vehicle information center 16 in accordance with the disclosed principles. It should be appreciated the novel disclosure provided herein is not limited to what component/control mechanism executes the method 200. In a desired embodiment, the method 200 is implemented in software, stored in a computer readable medium, which could be a random access memory (RAM) device, non-volatile random access memory (NVRAM) device, or a read-only memory (ROM) device) and executed by a processor in one and/or both of the control modules 18, 12. The method 200 can be performed continuously or periodically as part of background or normal processing, or it can be called any time a button is activated on the EVIC control panel 22.

At step 202, the vehicle's run position (i.e., the vehicle engine is off and the ignition key is in run position) is detected. The vehicle's run position allows the driver to view the EVIC display 20 without the vehicle's engine being on. If the vehicle is not in the run position, the method 200 may terminate or be repeated at another time.

At step 204, a transfer case screen 100 on the EVIC display 20 is detected. The EVIC display 20 may require the driver to scroll through a menu or multiple menus on the display 20 to get to the transfer case screen 100. The driver can scroll through the display 20 by using the electronically connected control panel 22. The control panel 22 may include one button or multiple buttons, and/or may be a touch screen. Alternatively, the display itself may be a touch screen, in which case the driver can scroll through the display 20 by directly contacting the display 20. If the EVIC display 20 is not displaying the transfer case screen 100, the method 200 may terminate or be repeated at another time.

At step 206, an input signal requesting to shift the transfer case 14 into or out of the neutral position is detected. The input signal is generated by the control module 18 when the driver scrolls through the EVIC display 20 and makes selections using the electronically connected control panel 22. Step 206 may further comprise determining whether the input signal to shift the transfer case 14 into or out of the neutral position was generated by a selection that was held for multiple seconds. For instance, if the EVIC 16 comprises a control panel 22 that has one or more buttons, the driver may be required to press the necessary button to shift the transfer case 14 into or out of the neutral position for at least five seconds. If this requirement is not met, the input is ignored and the driver must try again if he or she wants to shift the transfer case 14 into or out of the neutral position. This ensures that the driver's selection was not inadvertent.

At step 208, it is determined whether all predetermined conditions exist to allow the transfer case 14 to be shifted into or out of the neutral position. Predetermined conditions include, but are not limited to, the vehicle's engine being off, the vehicle's brake being applied, and the vehicle's transmission being in neutral. The vehicle's engine being off helps ensure that the transmission's output shaft does not rotate in any way before decoupling the transfer case 14 or while the transfer case 14 is already decoupled. The vehicle's brakes being applied helps ensure that the vehicle does not move and that the output shaft does not rotate. The transmission being in neutral helps to reduce or eliminate the binding of the gears in the transfer case 14. If the vehicle has an automatic transmission, the transmission is placed into neutral by shifting the vehicle into neutral. If the vehicle has a manual transmission, the transmission is placed into neutral by fully pressing the manual clutch into the floor, i.e., fully depressing the clutch pedal to the floor. If all predetermined conditions exist, the transfer case 14 is decoupled from the transmission or recoupled to the transmission depending on the driver's selection. If any one of the predetermined conditions does not exist, the transfer case 14 will not be shifted into or out of the neutral position.

What is claimed is:

1. A system for shifting a vehicle's transfer case into or out of a neutral position, the system comprising:
 a transfer case control module connected to a transfer case; and
 an electronic vehicle information center connected to the transfer case control module, the electronic vehicle information center instructing the transfer case control module to shift the transfer case into or out of the neutral position by:
  detecting an ignition key being in a run position;
  detecting an input signal request to shift the transfer case into or out of the neutral position;
  determining whether predetermined conditions exist to allow the transfer case to be shifted into or out of the neutral position, the predetermined conditions including each of the engine being off, the brake pedal being applied, and the transmission being in neutral;
  sending an instruction signal to the transfer case control module to shift the transfer case into or out of the neutral position based on the detected input signal only when the predetermined conditions exist and the input signal requesting to shift the transfer case into or out of the neutral position was held for a plurality of seconds.

2. The system of claim 1, further comprising a control panel for generating the input signal.

3. The system of claim 2, wherein the control panel is touch screen.

4. The system of claim 1, wherein the transfer case control module is a vehicle drivetrain control module.

5. The system of claim 1, wherein the electronic vehicle information center comprises an electronic display that provides visual and/or audio instructions for shifting the transfer case into or out of the neutral position.

6. The system of claim 1, wherein the electronic vehicle information center comprises an electronic display that outputs a visual and/or an audio indication of whether the transfer case has been shifted into or out of the neutral position.

7. The system of claim 1, wherein the electronic vehicle information center comprises a touch screen display device.

8. A method for shifting the transfer case into or out of a neutral position using an electronic vehicle information center, the method comprising:
 detecting an ignition key being in a run position;
 detecting a transfer case screen on an electronic vehicle information center display;
 detecting an input signal requesting to shift the transfer case into or out of the neutral position;
 determining whether predetermined conditions exist to allow the transfer case to be shifted into or out of the neutral position, the predetermined conditions including each of the engine being off, the brake pedal being applied, and the transmission being in neutral; and
 shifting the transfer case into or out of the neutral position only when the predetermined conditions exist and the input signal requesting to shift the transfer case into or out of the neutral position was held for a plurality of seconds.

9. The method of claim 8, wherein the input signal is generated after a selection is made on the electronic vehicle information center display.

10. The method of claim 8, wherein the electronic vehicle information center display provides visual and/or audio instructions at the transfer case screen for shifting the transfer case into or out of the neutral position.

11. The method of claim 8, wherein the electronic vehicle information center display outputs a visual and/or an audio an indication of whether the transfer case has been shifted into or out of the neutral position.

\* \* \* \* \*